(12) United States Patent
Kim et al.

(10) Patent No.: US 10,152,156 B2
(45) Date of Patent: Dec. 11, 2018

(54) TOUCH SENSOR INTEGRATED TYPE DISPLAY DEVICE

(71) Applicant: LG DISPLAY CO., LTD., Seoul (KR)

(72) Inventors: Jinseong Kim, Goyang-si (KR); Seungkyeom Kim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 5 days.

(21) Appl. No.: 15/389,171

(22) Filed: Dec. 22, 2016

(65) Prior Publication Data

US 2017/0192573 A1    Jul. 6, 2017

(30) Foreign Application Priority Data

Dec. 31, 2015    (KR) .................. 10-2015-0191812

(51) Int. Cl.
G06F 3/045    (2006.01)
G06F 3/041    (2006.01)
G06F 3/044    (2006.01)
G09G 3/20    (2006.01)

(52) U.S. Cl.
CPC ............ *G06F 3/0412* (2013.01); *G06F 3/044* (2013.01); *G06F 3/0416* (2013.01); *G09G 3/2092* (2013.01); *G09G 2300/08* (2013.01); *G09G 2310/0267* (2013.01); *G09G 2320/0219* (2013.01)

(58) Field of Classification Search
CPC ................... G06F 3/044; G06F 3/0412; G06F 2203/04111
See application file for complete search history.

(56) References Cited

U.S. PATENT DOCUMENTS

| 2012/0218199 A1* | 8/2012 | Kim | ...................... G06F 3/0412 345/173 |
| 2014/0168149 A1* | 6/2014 | Han | ...................... G06F 3/0412 345/174 |
| 2016/0041665 A1* | 2/2016 | Gwon | ..................... G06F 3/044 345/174 |

* cited by examiner

*Primary Examiner* — Yuzhen Shen
(74) *Attorney, Agent, or Firm* — Birch, Stewart, Kolasch & Birch, LLP

(57) ABSTRACT

A touch sensor integrated type display device can include a plurality of gate lines and a plurality of data lines crossing over each other, a plurality of pixel electrodes respectively disposed in areas defined by the crossing of the gate and data lines; a plurality of touch/common electrodes configured to form an electronic field together with the plurality of pixel electrodes, each touch/common electrode corresponds to p number of pixel electrodes arranged in a row direction and q number of pixel electrodes arranged in a column direction, in which p and q are natural numbers equal to or greater than two, and a plurality of touch/common lines respectively connected to the plurality of touch/common electrodes, in which a gate line corresponding to pixel electrodes of a q-th row overlaps a touch/common electrode of a subsequent stage following a touch/common electrode corresponding to the pixel electrodes of the q-th row.

18 Claims, 11 Drawing Sheets

TOUCH SENSOR INTEGRATED TYPE DISPLAY DEVICE

CROSS REFERENCE TO RELATED APPLICATIONS

This application claims the benefit of priority under 35 U.S.C. § 119(a) to Korean Patent Application No. 10-2015-0191812 filed in the Republic of Korea on Dec. 31, 2015, the entire contents of which is incorporated herein by reference for all purposes as if fully set forth herein.

BACKGROUND OF THE INVENTION

Field of the Invention

The present disclosure relates to a touch sensor integrated type display device, and more specifically, to a touch sensor integrated type display device capable of preventing generation of a defective image between touch/common electrodes.

Discussion of the Related Art

Flat panel displays (hereinafter referred to as "display devices"), which are able to be manufactured as a large-sized display device at a low price and excellent in display quality (including motion picture representation, resolution, brightness, contrast ratio, color representation, etc.), has been recently developed in accordance with the need for display devices capable of properly displaying multimedia together with the development of multimedia. Various input devices, such as a keyboard, a mouse, a track ball, a joystick, and a digitizer, have been used in the display devices to allow users to interface with the display devices.

However, when the user makes use of these input devices, the user's dissatisfaction increases because the user is required to learn how to use the input devices and the input devices occupy space, thereby having difficulty in increasing the perfection of products. Thus, a demand for a convenient and simple input device for the display device capable of reducing erroneous operations is increasing. In response to the increased demand, a touch sensor has been proposed to recognize information when the user inputs information by directly touching the screen or approaching the screen with his or her hand or a pen while he or she watches the display device.

The touch sensor has a simple configuration capable of reducing the erroneous operations. The user can also perform an input action without using a separate input device and can quickly and easily manipulate a display device through the contents displayed on the screen. Thus, the touch sensor has been applied to various display devices.

The touch sensor used in display devices may be classified into an add-on type touch sensor, an on-cell type touch sensor, and an integrated type (or in-cell type) touch sensor depending on its structure. The add-on type touch sensor is configured such that the display device and a touch sensor module including the touch sensor are individually manufactured and then the touch sensor module is attached to an upper substrate of the display device. The on-cell type touch sensor is configured such that elements constituting the touch sensor are directly formed on the surface of an upper glass substrate of the display device. The integrated type touch sensor is configured such that elements constituting the touch sensor are mounted inside the display device to thereby achieve a thin profile and increase the durability of the display device.

Among the above touch sensors, a thickness of the display device is decreased as compared to the other touch sensors because the integrated type touch sensor may commonly use a common electrode of the display device as a touch/common electrode. Further, since the touch elements of the in-cell type touch sensor are formed inside the display device, the durability of the display device may increase. Hence, the in-cell type touch sensor has been widely used.

The integrated type touch sensor can solve the problems generated in the add-on type touch sensor and the on-cell type touch sensor because of the advantages of the thin profile and the durability improvement. The integrated type touch sensor may be divided into a light type touch sensor and a capacitive touch sensor depending on a method for sensing a touched portion. The capacitive touch sensor may be subdivided into a self-capacitive touch sensor and a mutual capacitive touch sensor.

The self-capacitive touch sensor forms a plurality of independent patterns in a touch area of a touch sensing panel and measures changes in capacitance of each independent pattern, thereby deciding whether or not a touch operation is performed. The mutual capacitive touch sensor crosses X-axis electrode lines (for example, driving electrode lines) and Y-axis electrode lines (for example, sensing electrode lines) in a touch/common electrode formation area of a touch sensing panel to form a matrix, applies a driving pulse to the X-axis electrode lines, and senses changes in voltages generated in sensing nodes defined as crossings of the X-axis electrode lines and the Y-axis electrode lines through the Y-axis electrode lines, thereby deciding whether or not a touch operation is performed.

In the mutual capacitive touch sensor, a mutual capacitance generated in touch recognition of the mutual capacitive touch sensor is very small, but a parasitic capacitance between gate line and data lines constituting the display device is very large. Therefore, it is difficult to accurately recognize a touch position because of the parasitic capacitance.

Further, the mutual capacitive touch sensor requires a very complex wiring structure because a plurality of touch driving lines for a touch drive and a plurality of touch sensing lines for a touch sensing have to be formed on the common electrode for multi-touch recognition.

On the other hand, because the self-capacitive touch sensor has a simpler wiring structure than the mutual capacitive touch sensor, touch accuracy may increase. Hence, the self-capacitive touch sensor has been widely used, if necessary or desired.

A related art liquid crystal display (hereinafter referred to as "touch sensor integrated type display device"), in which a self-capacitive touch sensor is integrated, is described below with reference to FIGS. 1 to 5.

FIG. 1 is a plan view schematically illustrating a related art touch sensor integrated type display device. FIG. 2 is a plan view of a portion A1 shown in FIG. 1, and FIG. 3 is a plan view of a portion A2 shown in FIG. 2. FIG. 4 is a cross-sectional view taken along line I-I' shown in FIG. 3. FIG. 5 is a waveform diagram illustrating a ripple voltage generated in a touch/common electrode due to a gate signal applied to a gate line in a related art touch sensor integrated type display device.

Referring to FIG. 1, a touch sensor integrated type display device includes an active area AA, in which touch/common electrodes and pixel electrodes are disposed and data is displayed, and a bezel area BA disposed outside the active area AA. In the bezel area BA, various wires and driver integrated circuits (ICs) are disposed.

The active area AA includes a plurality of touch/common electrodes C11 to Cki disposed in a first direction (for example, x-axis direction) and a second direction (for example, y-axis direction) crossing the first direction and a plurality of touch/common lines L11 to Lki, that are arranged in parallel with one another in the second direction to connect the plurality of touch/common electrodes C11 to Cki to driver ICs IC1 to ICi.

The plurality of touch/common electrodes C11 to Cki disposed in the active area AA are formed by dividing a common electrode of a related art display device into multiple touch electrodes. The plurality of touch/common electrodes C11 to Cki operate as common electrodes in a display mode for displaying data and operate as touch electrodes in a touch mode for recognizing a touch location.

Referring to FIGS. 2 to 4, in the related art touch sensor integrated type display device, a plurality of pixel electrodes P correspond to one touch/common electrode. In an example of FIG. 2, twelve pixel electrodes P disposed in two rows and six columns are disposed to correspond to each of touch/common electrodes C11, C21, and C31.

The pixel electrodes P are respectively disposed in areas defined by gate lines G1 to G6 and data lines D1 to D6.

The pixel electrodes P are connected to the data lines D1 to D6 through thin film transistors and receive data voltages synchronized with gate signals supplied from the gate lines G1 to G6.

The touch/common electrodes C11, C21, and C31 receive a common voltage through touch/common lines L11, L21, and L31 in a display driving period and receive a touch driving voltage in a touch driving period. During the touch driving period, the touch/common lines L11, L21, and L31 supply a touch sensing voltage sensed by the touch/common electrodes C11, C21, and C31 to the driver ICs. The driver ICs determine a touch/non-touch operation and a touch location using a known touch algorithm.

The gate lines G1 to G6 and a gate electrode GE of a thin film transistor TFT are disposed on a substrate SUB.

The thin film transistor TFT includes the gate electrode GE extended from a gate line GL on the substrate SUB, a semiconductor active layer A that is disposed on a gate insulating layer GI covering the gate line GL and the gate electrode GE and partially overlaps the gate electrode GE, and a source electrode SE and a drain electrode DE are formed on the semiconductor active layer A and spaced apart from each other by a predetermined distance.

The data line D1 is disposed on the same layer as the source electrode SE and the drain electrode DE and is connected to the source electrode SE and spaced apart from the drain electrode DE.

The pixel electrode P is formed on the gate insulating layer GI and the drain electrode DE and is directly connected to the drain electrode DE.

The data line DL, the source electrode SE and the drain electrode DE of the thin film transistor TFT, and the pixel electrode P are covered with a first insulating layer INS1. The touch/common line L11 is formed on the first insulating layer INS1 and overlaps the data line D1. The touch/common line L11 on the first insulating layer INS1 is covered with a second insulating layer INS2.

The touch/common electrode C11 is disposed on the second insulating layer INS2 and overlaps the pixel electrodes P. The touch/common electrode C11 includes a plurality of slits SL, so as to form a horizontal electric field together with the pixel electrodes P. The touch/common electrode C11 is connected to the touch/common line L11 exposed through a contact hole CH passing through the second insulating layer INS2.

In the above-described touch sensor integrated type display device according to the related art, the touch/common electrode C11 is not disposed at a formation location of the thin film transistor TFT, in order to prevent the generation of parasitic capacitance. Namely, the touch/common electrode C11 is disposed not to overlap the thin film transistor TFT. Thus, a second gate line G2 is disposed between the touch/common electrodes C11 and C21, which are adjacent to each other in a vertical direction.

According to the above-described configuration of the related art touch sensor integrated type display device, the first gate line G1 is disposed to overlap the first touch/common electrode C11, but the second gate line G2 is disposed not to overlap the first touch/common electrode C11 and the second touch/common electrode C21 underlying the first touch/common electrode C11. Namely, the second gate line G2 between the adjacent touch/common electrodes C11 and C21 does not overlap any touch/common electrode.

Referring to FIG. 5, when gate signals are sequentially supplied to the first to third gate lines G1 to G3, a ripple voltage is generated at a start point "a" and an end point "b" of each gate signal due to a coupling signal between the gate signal and the common voltage. However, a defective image is displayed on horizontal lines in the related art touch sensor integrated type display device because of a difference between a first parasitic capacitance between a gate line inside a touch/common electrode and the touch/common electrode, and a second parasitic capacitance between a gate line at a boundary of vertically adjacent touch/common electrodes and the touch/common electrode.

More specifically, for example, a first ripple voltage r1 is generated in a touch/common electrode CI 1 of a proceeding stage by a first gate signal supplied to a first gate line G1 inside the touch/common electrode C11. When a second gate signal subsequent to the first gate signal is supplied to a second gate line G2, a second ripple voltage r2 having the same amplitude as the first ripple voltage r1 and a polarity opposite the first ripple voltage r1 is generated in the touch/common electrode C11 by the second gate signal. Thus, in the touch/common electrode C11 of the proceeding stage, the first ripple voltage r1 can be compensated by the second ripple voltage r2 having the same amplitude and the same frequency as the first ripple voltage r1.

However, a third ripple voltage r3 having the same configuration as the first ripple voltage r1 is generated at a boundary of the touch/common electrode C11 of the proceeding stage adjacent to the second gate line G2 by the second gate signal supplied to the second gate line G2 related to pixel electrodes P corresponding to the touch/common electrode C11. Further, a fourth ripple voltage r4 having an amplitude smaller than the third ripple voltage r3 is generated at a boundary of a touch/common electrode C21 of a subsequent stage adjacent to the second gate line G2 because there is an open area between the first touch/common electrode C11 and the second touch/common electrode C21. As a result, the fourth ripple voltage r4 cannot compensate for the third ripple voltage r3.

Accordingly, in the related art touch sensor integrated type display device, a level of the common voltage becomes unstable because of a difference between a first ripple voltage difference V1 inside the touch/common electrode and a second ripple voltage difference V2 at a boundary of the touch/common electrode. Hence, when the pixels are charged, bright horizontal lines are displayed on an image due to changes in the level of the common voltage, thereby generating a defective image.

SUMMARY OF THE INVENTION

The present disclosure provides a touch sensor integrated type display device capable of preventing generation of a defective image, on which horizontal lines are displayed, between touch/common electrodes.

In one aspect, there is provided a touch sensor integrated type display device including a plurality of gate lines and a plurality of data lines crossing each other; a plurality of pixel electrodes respectively disposed in areas defined by the crossing of the plurality of gate lines and the plurality of data lines and supplied with a data voltage; a plurality of touch/common electrodes configured to form an electronic field together with the plurality of pixel electrodes, each touch/common electrode being disposed corresponding to p pieces of pixel electrodes arranged in a row direction and q pieces of pixel electrodes arranged in a column direction, wherein p and q are a natural number equal to or greater than two; and a plurality of touch/common lines respectively connected to the plurality of touch/common electrodes, in which a gate line corresponding to pixel electrodes of a q-th row in the plurality of gate lines overlaps a touch/common electrode of a subsequent stage following a touch/common electrode corresponding to the pixel electrodes of the q-th row.

The touch sensor integrated type display device further includes a plurality of thin film transistors disposed adjacent to crossings of the plurality of gate lines and the plurality of data lines, each thin film transistor supplying a data voltage received from the data line to the pixel electrode. Gate electrodes of the thin film transistors corresponding to the pixel electrodes of the q-th row are disposed between the touch/common electrode corresponding to the pixel electrodes of the q-th row and the touch/common electrode of the subsequent stage.

The plurality of touch/common lines have the same length in a display area, in which the plurality of pixel electrodes and the plurality of touch/common electrodes are disposed.

The gate lines and gate electrodes of the thin film transistors are disposed on a substrate. The data lines and source electrodes and drain electrodes of the thin film transistors are disposed on a gate insulating layer covering the gate lines and the gate electrodes. The pixel electrodes are disposed on a first insulating layer covering the data lines and the source electrodes and the drain electrodes of the thin film transistors. The touch/common lines are disposed in parallel with one another on a second insulating layer covering the pixel electrodes. The touch/common electrodes are disposed on a third insulating layer covering the touch/common lines and overlap the pixel electrodes.

Each pixel electrode is connected to the drain electrode of the thin film transistor exposed through a first contact hole passing through the first insulating layer.

The touch/common electrodes are respectively connected to the touch/common lines exposed through second contact holes passing through the third insulating layer.

The touch/common lines respectively overlap the data lines.

The touch sensor integrated type display device according to the present disclosure can remove a ripple voltage at a boundary between touch/common electrodes by overlapping a gate line between touch/common electrodes, which are adjacent to each other in a vertical direction, with a touch/common electrode of a subsequent stage, thereby preventing a defective image with horizontal lines.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail to embodiments of the invention, examples of which are illustrated in the accompanying drawings. Wherever possible, the same reference numbers will be used throughout the drawings to refer to the same or like parts. Detailed description of known arts will be omitted if it is determined that the arts can mislead the embodiments of the invention.

A touch sensor integrated type display device according to an embodiment of the invention may be implemented as a flat panel display device, such as a liquid crystal display (LCD), a field emission display (FED), a plasma display panel (PDP), an organic light emitting diode (OLED) display, and an electrophoretic display (EPD). In the following description, embodiments of the invention will be described using a liquid crystal display as an example of a flat panel display. However, embodiments of the invention are not limited thereto, and other flat panel displays may be used. For example, a touch sensor integrated type display device according to an embodiment of the invention can be any display device to which an in-cell touch sensor technology is applicable.

A description will be given of a touch sensor integrated type display device according to an embodiment of the invention with reference to FIGS. 6 to 11.

Figure 1:
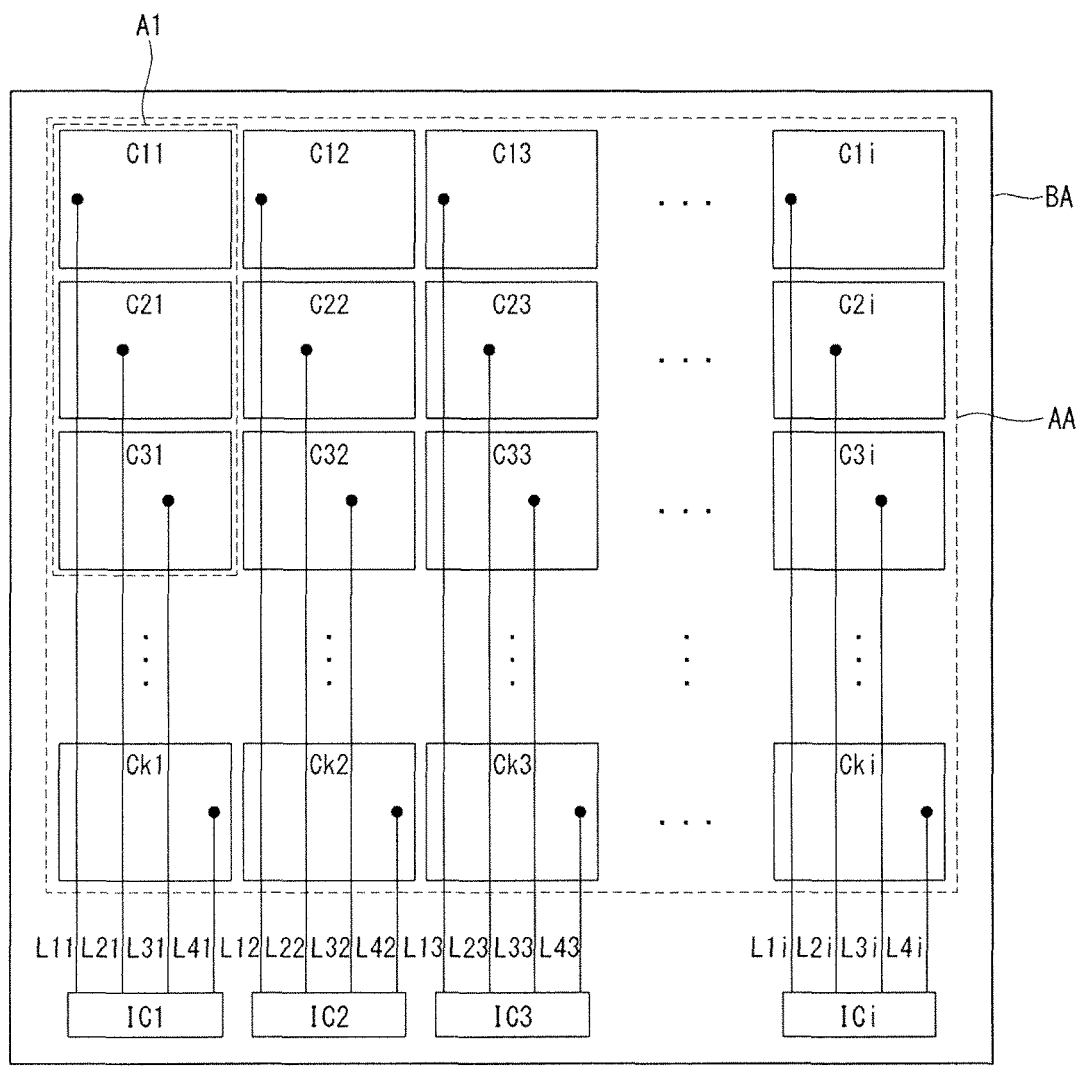
FIG. 1 is a plan view schematically illustrating a related art touch sensor integrated type display device.
Figure 2:
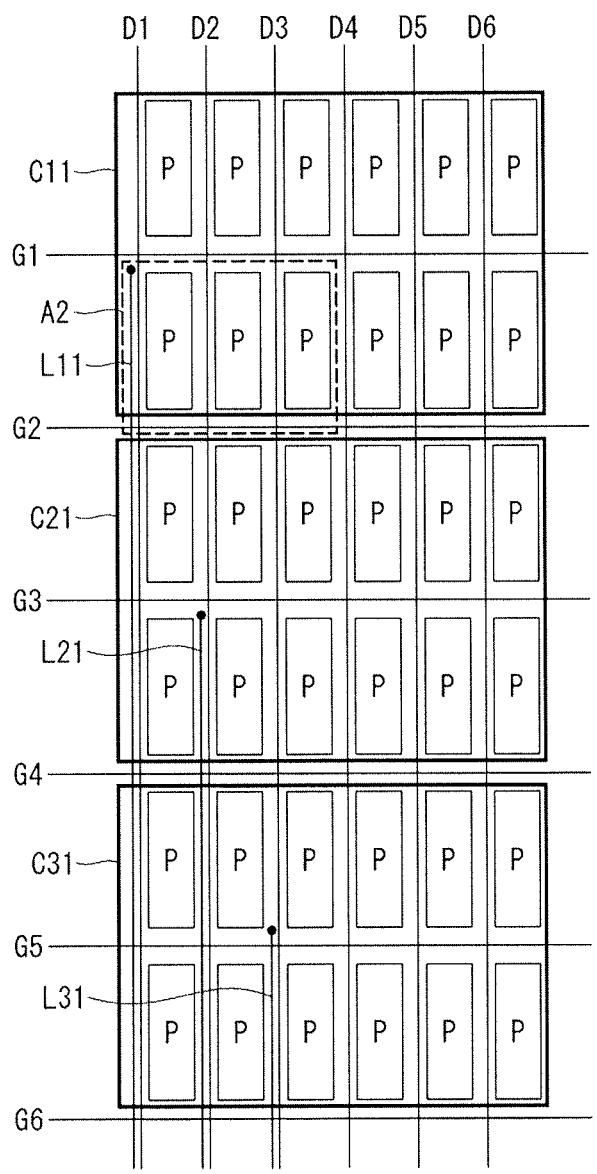
FIG. 2 is a plan view of a portion A1 shown in FIG. 1.
Figure 3:
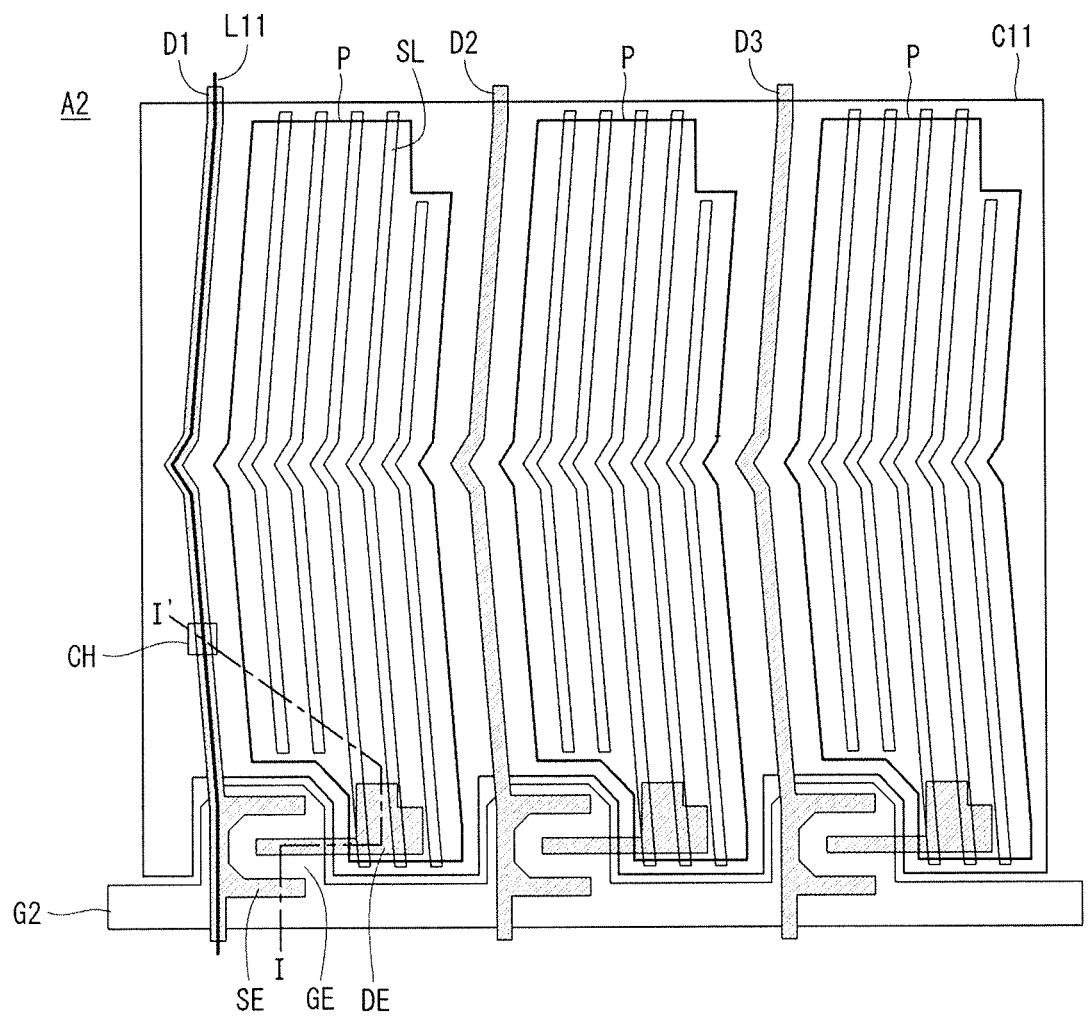
FIG. 3 is a plan view of a portion A2 shown in FIG. 2.
Figure 4:
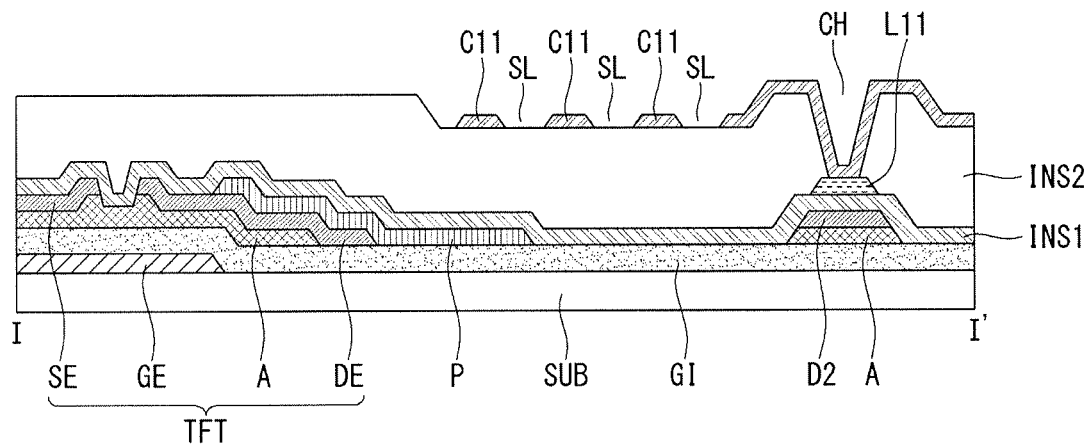
FIG. 4 is a cross-sectional view taken along line I-I' shown in FIG. 3.
Figure 5:
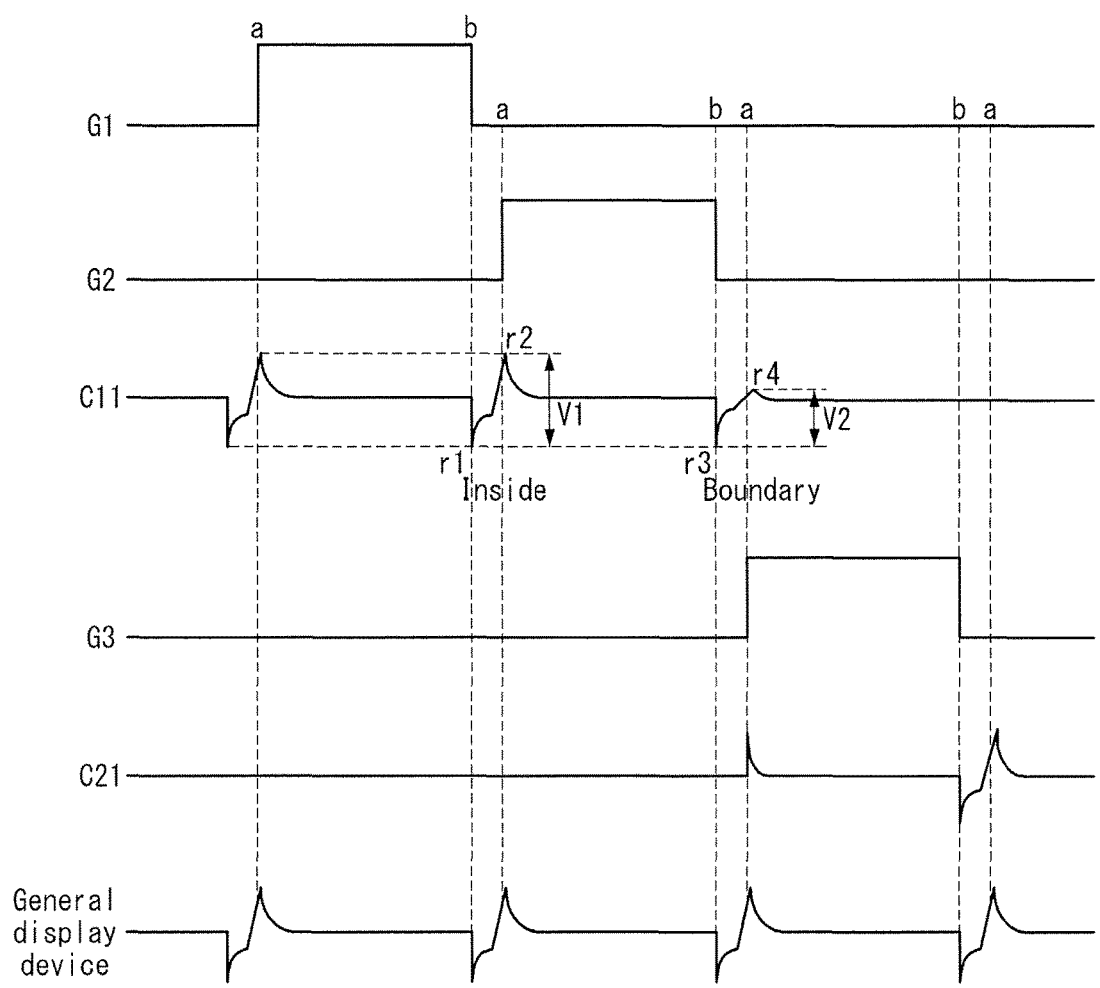
FIG. 5 is a waveform diagram illustrating a ripple voltage generated in a touch/common electrode due to a gate signal applied to a gate line in a related art touch sensor integrated type display device.
Figure 6:
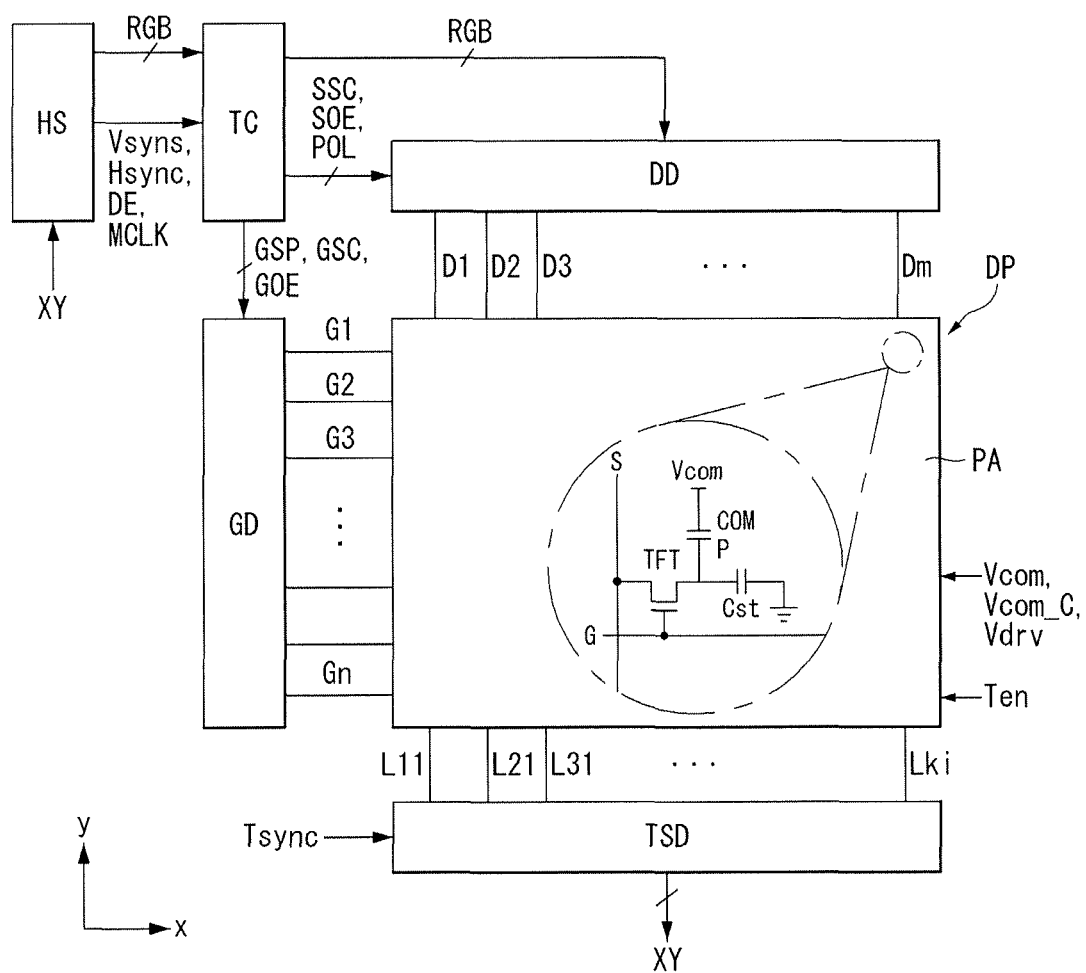
FIG. 6 is a block diagram schematically illustrating a touch sensor integrated type display device according to an embodiment of the invention.
Figure 7:
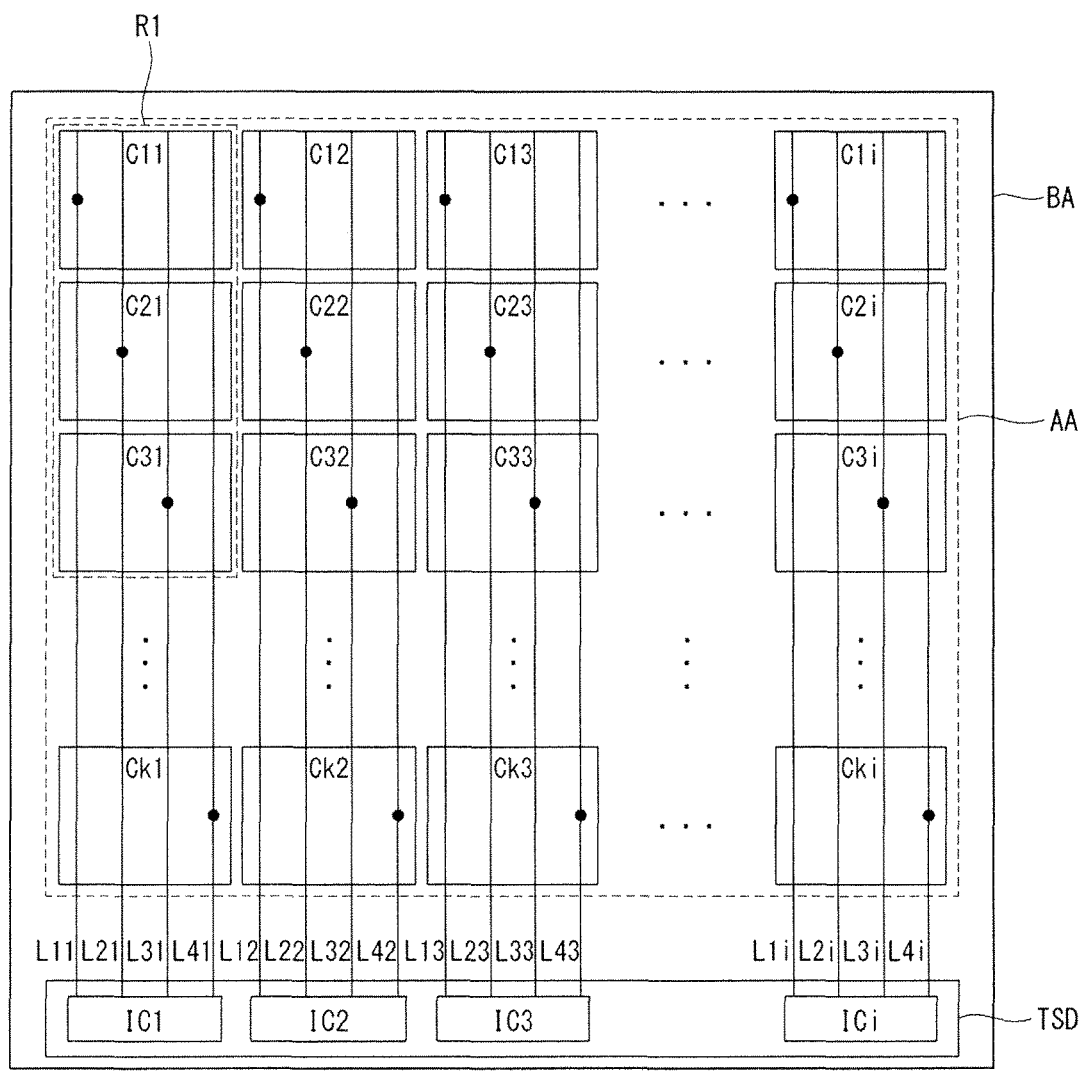
FIG. 7 is a plan view illustrating a relationship between touch/common electrodes and touch/common lines in a portion R1 of a touch sensor integrated type display device shown in FIG. 6.
Figure 8:
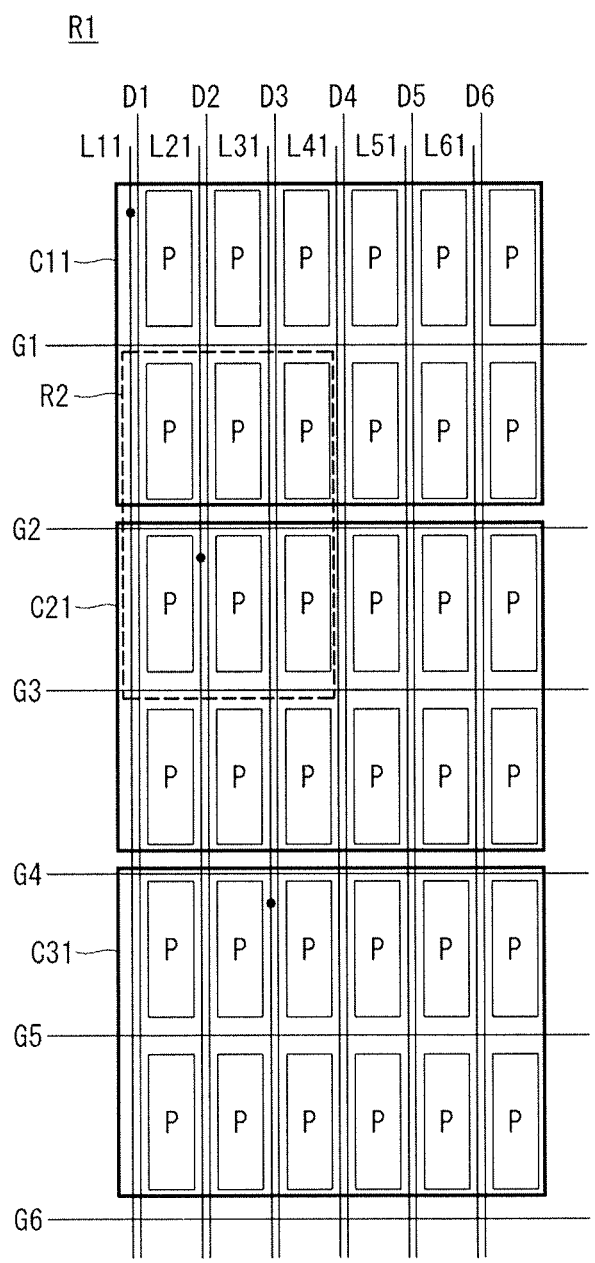
FIG. 8 is a plan view schematically illustrating a relationship between touch/common electrodes and pixel electrodes in a portion R1 shown in FIG. 7.
Figure 9:
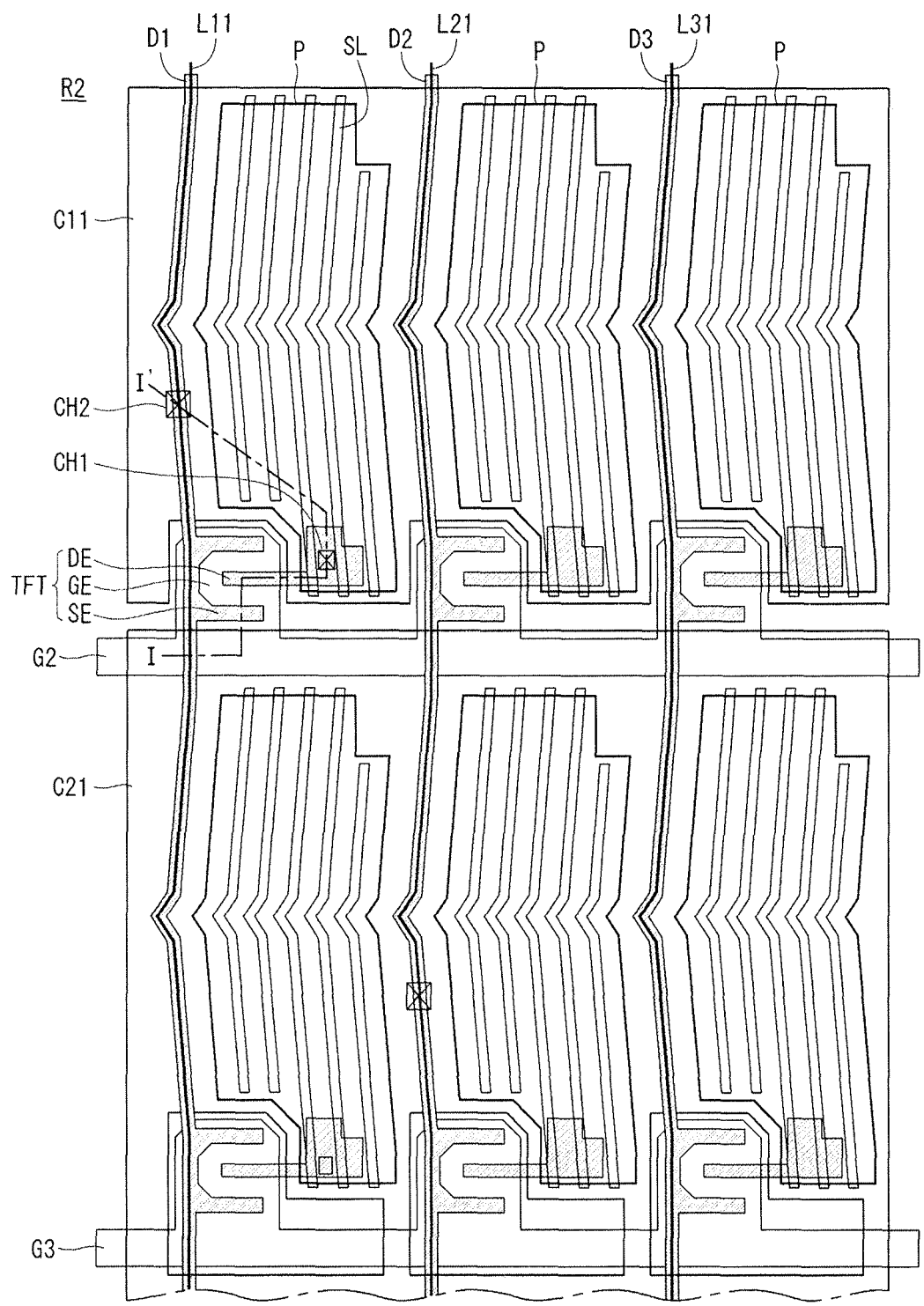
FIG. 9 is a plan view illustrating in detail a portion R2 shown in FIG. 8.
Figure 10:
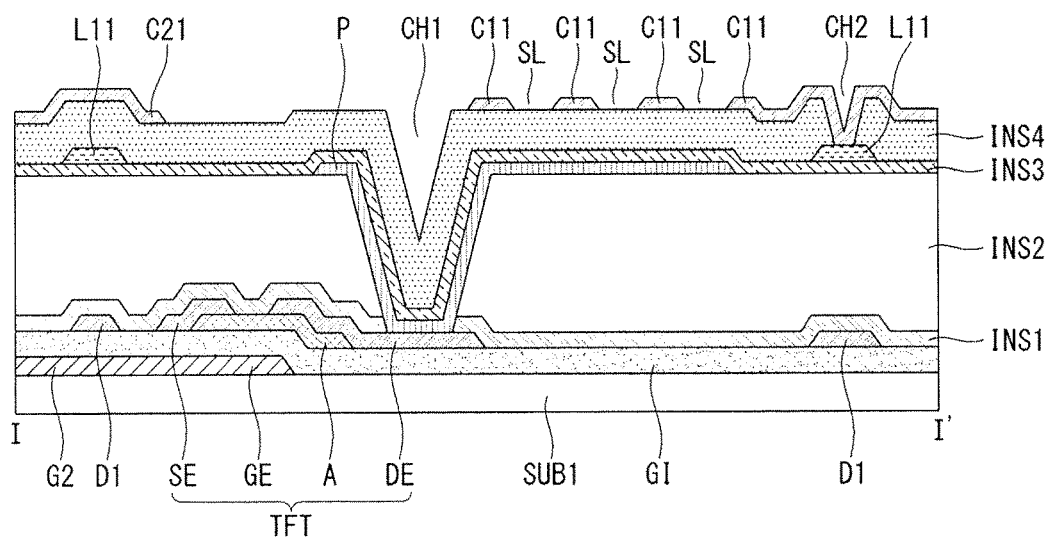
FIG. 10 is a cross-sectional view taken along line I-I' shown in FIG. 9.
Figure 11:
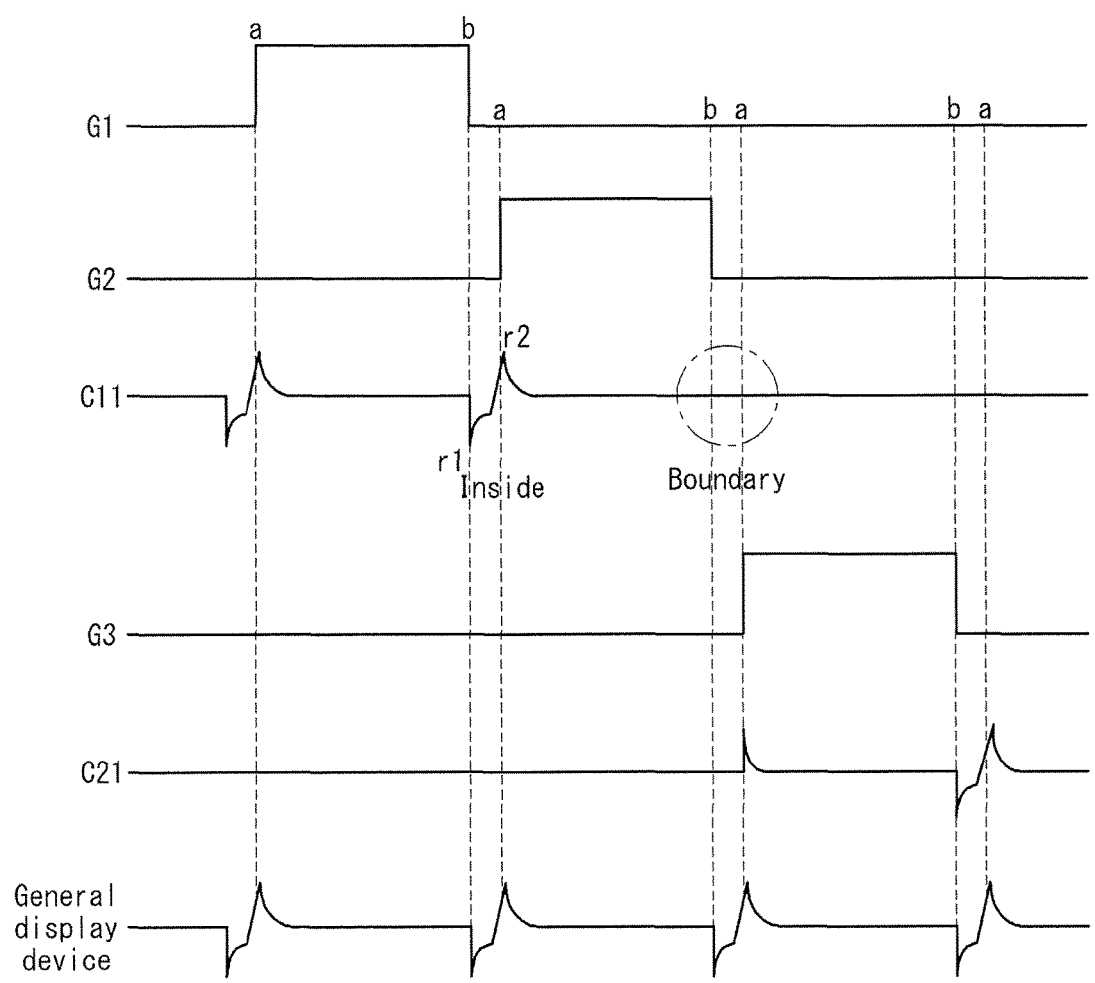
FIG. 11 is a waveform diagram illustrating a ripple voltage generated in a touch/common electrode due to a gate signal applied to a gate line in a touch sensor integrated type display device according to an embodiment of the invention.

FIG. 6 is a block diagram schematically illustrating a touch sensor integrated type display device according to an embodiment of the invention. FIG. 7 is a plan view illustrating a relationship between touch/common electrodes and touch/common lines in a portion R1 of a touch sensor integrated type display device shown in FIG. 6. FIG. 8 is a plan view schematically illustrating a relationship between touch/common electrodes and pixel electrodes in a portion R1 shown in FIG. 7. FIG. 9 is a plan view illustrating in detail a portion R2 shown in FIG. 8. FIG. 10 is a cross-sectional view taken along line I-I' shown in FIG. 9. FIG. 11 is a waveform diagram illustrating a ripple voltage generated in a touch/common electrode due to a gate signal applied to a gate line in a touch sensor integrated type display device according to an embodiment of the invention.

Referring to FIG. 6, a touch sensor integrated type display device according to an embodiment of the invention includes a display panel DP including a pixel array PA, a display driver (DD, GD, and TC) writing data of an input image to pixels of the display panel DP, and a touch sensor driver TSD driving touch sensors.

Referring to FIGS. 7 to 10, the display panel DP of the touch sensor integrated type display device according to the embodiment of the invention includes an active area AA, in which touch/common electrodes C11 to Cki and pixel electrodes P are disposed and data is displayed, and a bezel area BA disposed outside the active area AA. In the bezel area BA, various wires and the touch sensor driver TSD including driver integrated circuits (ICs) are disposed.

The active area AA includes the plurality of touch/common electrodes C11 to Cki disposed in a first direction (for example, x-axis direction) and a second direction (for example, y-axis direction) crossing the first direction and a plurality of touch/common lines L11 to Lki, that are arranged in parallel with one another in the second direction to connect the plurality of touch/common electrodes C11 to Cki to driver ICs IC1 to ICi of the touch sensor driver TSD.

The plurality of touch/common electrodes C11 to Cki disposed in the active area AA are formed by dividing a common electrode of the display device. The plurality of touch/common electrodes C11 to Cki operate as common electrodes in a display mode for displaying data and operate as touch electrodes in a touch mode for recognizing a touch location. The touch sensor integrated type display device according to the embodiment of the invention is time-division driven by dividing one frame period into a display driving period and a touch sensor driving period. During the display driving period, input data is written to the pixels. During the touch sensor driving period, the touch sensors are driven and sense a touch input.

Referring again to FIG. 6, the display driver (DD, GD, and TC) includes a data driver DD, a gate driver GD, and a timing controller TC.

During the display driving period, the data driver DD converts digital video data RGB of an input image received from the timing controller TC into positive and negative analog gamma compensation voltages and outputs a data voltage. The data driver DD supplies the data voltage to data lines D1 to Dm.

During the touch sensor driving period, the data driver DD applies an AC (alternating current) signal having the same phase and the same amplitude as a touch driving signal Vdrv applied to the touch sensors to the data lines D1 to Dm and minimizes a parasitic capacitance between the touch sensors and the data lines D1 to Dm. This is because voltages of both ends of the parasitic capacitance simultaneously change, and an amount of charges charged to the parasitic capacitance decreases as a voltage difference between both ends of the parasitic capacitance decreases.

During the display driving period, the gate driver GD sequentially supplies a gate pulse (or a scan pulse) synchronized with the data voltage to gate lines G1 to Gn and selects lines of the display panel DP, to which the data voltage is applied. The gate pulse swings between a gate high voltage VGH and a gate low voltage VGL. The gate pulse is applied to gate electrodes of thin film transistors through the gate lines G1 to Gn. The gate high voltage VGH is set to a voltage greater than a threshold voltage of the thin film transistor and turns on the thin film transistor. The gate low voltage VGL is set to a voltage less than the threshold voltage of the thin film transistor and turns off the thin film transistor.

During the touch sensor driving period, the gate driver GD applies the AC signal having the same phase and the same amplitude as the touch driving signal Vdrv applied to the touch sensors to the gate lines G1 to Gn and minimizes a parasitic capacitance between a sensor electrode and the gate lines G1 to Gn. A voltage of the AC signal applied to the gate lines G1 to Gn during the touch sensor driving period is less than the gate high voltage VGH and the threshold voltage of the thin film transistor, so that data written to the pixels does not change.

The timing controller TC receives timing signals such as a vertical sync signal Vsync, a horizontal sync signal Hsync, a data enable signal DE, and a main clock MCLK from a host system HS and generates timing control signals for controlling operation timing of the data driver DD and the gate driver GD. Scan timing control signals of the gate driver GD include a gate start pulse GSP, a gate shift clock GSC, a gate output enable signal GOE, and the like. Data timing control signals of the data driver DD include a source sampling clock SSC, a polarity control signal POL, and a source output enable signal SOE, and the like.

The host system HS may be one of a television system, a set-top box, a navigation system, a DVD player, a Blu-ray player, a personal computer (PC), a home theater system, a phone system, and other systems that include or operate in conjunction with a display. The host system HS includes a system-on chip (SoC), in which a scaler is embedded, and thus converts digital video data RGB of an input image into a data format suitable for a resolution of the display panel DP. The host system HS transmits the digital video data RGB of the input image and the timing signals Vsync, Hsync, DE, and MCLK to the timing controller TC. Further, the host system HS runs an application associated with coordinate information XY of a touch input received from the touch sensor driver TSD.

The timing controller TC or the host system HS may generate a sync signal Tsync for synchronizing the display driver (DD, GD, and TC) with the touch sensor driver TSD.

The touch sensor driver TSD generates a voltage of the touch driving signal Vdrv to be supplied to the touch/common electrodes C11 to Cki during the touch sensor driving period. A capacitance of a self-capacitive touch sensor increases when a user approaches or contacts a sensor electrode with his or her finger. The touch sensor driver TSD may apply the touch driving signal Vdrv to the touch/common electrodes C11 to Cki and measure changes in a capacitance (or charges) of the sensor electrode resulting from a contact object, thereby sensing a touch location and a touch area. The touch sensor driver TSD calculates the coordinate information XY of the touch input and transmits the calculated coordinate information XY to the host system HS.

Referring to FIGS. 8 and 9, in the touch sensor integrated type display device according to the embodiment of the invention, the plurality of pixel electrodes P correspond to one touch/common electrode (for example, the touch/common electrode C11). In an example of FIG. 8, 36 pixel electrodes P disposed on six rows and six columns are correspond to touch/common electrodes C11, C21, and C31. However, this is merely an example and the number of pixel electrodes corresponding to one touch/common electrode may be properly changed, if necessary or desired.

The pixel electrodes P are respectively disposed in areas defined by gate lines G1 to G6 and data lines D1 to D6.

The pixel electrodes P are connected to the data lines D1 to D6 through thin film transistors and receive data voltages synchronized with gate signals supplied from the gate lines G1 to G6.

The touch/common electrodes C11, C21, and C31 receive a common voltage through touch/common lines L11, L21, and L31 in the display driving period and receive a touch driving voltage in the touch driving period. During the touch driving period, the touch/common lines L11, L21, and L31 supply a touch sensing voltage sensed by the touch/common electrodes C11, C21, and C31 to driver ICs of a touch sensor driver TSD. The driver ICs determine a touch/non-touch operation and a touch location using a known touch algorithm.

The gate lines G1 to G6 and a gate electrode GE of a thin film transistor TFT are disposed on a substrate SUB.

The thin film transistor TFT includes the gate electrode GE extended from a gate line GL on the substrate SUB, a semiconductor active layer A is disposed on a gate insulating layer GI covering the gate line GL and the gate electrode GE, and the semiconductor active layer A partially overlaps the gate electrode GE, and a source electrode SE and a drain electrode DE that are formed on the semiconductor active layer A and spaced apart from each other by a predetermined distance.

The data line D1 is disposed on the same layer as the source electrode SE and the drain electrode DE and is connected to the source electrode SE of the thin film transistor TFT.

A first insulating layer INS1 and a second insulating layer INS2 are sequentially disposed on the gate insulating layer GI, on which the data line D1, the source electrode SE, and the drain electrode DE are disposed, and cover the data line D1, the source electrode SE, and the drain electrode DE. The first insulating layer INS1 may be formed of an inorganic insulating material such as silicon oxide and silicon nitride, and the second insulating layer INS2 may be formed of an organic insulating material such as photo acrylic (PAC). One of the first insulating layer INS1 and the second insulating layer INS2 may be omitted.

The pixel electrodes P are disposed on the second insulating layer INS2 in areas formed by a crossing structure of the date lines and the gate lines. The pixel electrode P is connected to the drain electrode DE of the thin film transistor TFT exposed through a first contact hole CH1 passing through the first and second insulating layers INS1 and INS2.

A third insulation layer INS3 is disposed on the second insulation layer INS2 to cover the pixel electrodes P. The touch/common line L11 is disposed on the third insulating layer INS3. The touch/common line L11 is disposed to overlap the data line D1. When the touch/common line L11 is disposed to overlap the data line D1, the touch/common line L11 does not reduce an aperture ratio even if the touch/common line L11 is made of an opaque metal with high conductivity. Therefore, the touch/common line L11 can reduce a resistance of the touch/common electrode C11 made of a transparent electrode having a high resistance. The touch/common lines L11 to Lki are disposed in parallel with one another. The touch/common lines L11 to Lki may have the same length in the active area AA. In this instance, because all of the touch/common electrodes C11 to Cki overlap the same number of touch/common lines, an electric field inside the touch/common electrode is equally maintained at any location by the touch/common lines. Thus, the embodiment of the invention can prevent a reduction (for example, spot) in image quality of a display device generated by an electric field difference resulting from a length difference between touch/common lines L11 to Lki in a related art.

A fourth insulating layer INS4 is disposed on the third insulating layer INS3, on which the touch/common lines L111 to Lki are disposed, and covers the touch/common lines L11 to Lki.

As shown in FIG. 8, each of the touch/common electrodes C11, C21, and C31 is disposed on the fourth insulating layer INS4 and overlaps the plurality of pixel electrodes P. In an example of FIG. 8, one touch/common electrode is disposed to overlap 36 pixel electrodes P disposed on six rows and six columns. However, embodiments of the invention are not limited thereto.

The touch/common electrodes C11, C21, and C31 are respectively connected to the touch/common lines L11, L21, and L31 exposed through a second contact hole CH2 passing through the fourth insulating layer INS4.

In the touch/common electrodes C11 and C21, which are adjacent to each other in a vertical direction, of the touch sensor integrated type display device according to the embodiment of the invention, the touch/common electrode C21 of a subsequent stage is disposed to overlap the gate line G2 of a proceeding stage related to the pixel electrodes P corresponding to the touch/common electrode C11 of the proceeding stage at an upper end of the touch/common electrode C21. On the other hand, the gate electrode GE, that is connected to or extended from the gate line G2 of the proceeding stage, is disposed between the touch/common electrode C11 of the proceeding stage and the touch/common electrode C21 of the subsequent stage.

Referring to FIG. 11, a first ripple voltage r1 is generated inside each touch/common electrode by a first gate signal supplied to the first gate line G1, but is offset by a second ripple voltage r2 generated by a second gate signal supplied to the second gate line G2.

Because the second gate line G2 overlaps the touch/common electrode C21 of the subsequent stage at a boundary between the touch/common electrode C11 of the proceeding stage and the touch/common electrode C21 of the subsequent stage, a parasitic capacitance is not generated in the touch/common electrode C11 of the proceeding stage due to the second gate line G2.

Thus, the second gate line G2 reduces a parasitic capacitance of the touch/common electrode C11 of the proceeding stage at the boundary and increases a parasitic capacitance of the touch/common electrode C21 of the subsequent stage at the boundary. As a result, ripple voltages of the touch/common electrodes of the proceeding stage and the subsequent stage can offset each other at the boundary between the touch/common electrode C11 of the proceeding stage and the touch/common electrode C21 of the subsequent stage.

Accordingly, because the ripple voltage resulting from the parasitic capacitance of the touch/common electrode C11 of the proceeding stage at the boundary is offset by the ripple voltage resulting from the parasitic capacitance of the touch/common electrode C21 of the subsequent stage at the boundary, the embodiment of the invention can stably supply the common voltage when pixels are charged. As a result, the embodiment of the invention can remove a defective image (for example, bright horizontal lines) in the related art.

Although embodiments have been described with reference to a number of illustrative embodiments thereof, it should be understood that numerous other modifications and embodiments can be devised by those skilled in the art that will fall within the scope of the principles of this disclosure.

For example, the embodiment of the invention described that a total of twelve pixel electrodes disposed on six rows and two columns are disposed corresponding to one touch/common electrode. However, embodiments of the invention are not limited thereto, and this is merely an example for convenience of explanation.

Thus, various variations and modifications are possible in the component parts and/or arrangements of the subject combination arrangement within the scope of the disclosure, the drawings and the appended claims.

What is claimed is:

1. A touch sensor integrated type display device comprising:
   a plurality of gate lines and a plurality of data lines crossing over each other;
   a plurality of pixel electrodes respectively disposed in areas defined by the crossing of the plurality of gate lines and the plurality of data lines;
   a plurality of touch/common electrodes configured to form an electronic field together with the plurality of pixel electrodes, each of the plurality of touch/common electrodes corresponds to p number of pixel electrodes arranged in a row direction and q number of pixel electrodes arranged in a column direction, wherein p and q are natural numbers equal to or greater than two; and
   a plurality of touch/common lines respectively connected to the plurality of touch/common electrodes,
   wherein a gate line corresponding to pixel electrodes of a q-th row among the plurality of gate lines overlaps a touch/common electrode of a subsequent stage following a touch/common electrode corresponding to the pixel electrodes of the q-th row, and
   wherein the overlapping of the gate line and the touch/common electrode offsets a first voltage ripple in the touch/common electrode due to a first gate signal supplied to the gate line with a second voltage ripple in the touch/common electrode due to a second gate signal supplied to another gate line connected to a different row of pixels corresponding to another touch/common electrode.

2. The touch sensor integrated type display device of claim 1, further comprising a plurality of thin film transistors disposed adjacent to the crossings of the plurality of gate lines and the plurality of data lines, each of the plurality of thin film transistors supplying a data voltage received from the corresponding data line to the corresponding pixel electrode,
   wherein gate electrodes of thin film transistors corresponding to the pixel electrodes of the q-th row are disposed between the touch/common electrode corresponding to the pixel electrodes of the q-th row and the touch/common electrode of the subsequent stage.

3. The touch sensor integrated type display device of claim 2, wherein the plurality of gate lines and gate electrodes of the plurality of thin film transistors are disposed on a substrate,
   wherein the plurality of data lines and source and drain electrodes of the plurality of thin film transistors are disposed on a gate insulating layer covering the plurality of gate lines and the gate electrodes of the plurality of thin film transistors,
   wherein the plurality of pixel electrodes are disposed on a first insulating layer covering the plurality of data lines and the source and drain electrodes of the plurality of thin film transistors,
   wherein the plurality of touch/common lines are disposed in parallel with one another on a second insulating layer covering the plurality of pixel electrodes, and
   wherein the plurality of touch/common electrodes are disposed on a third insulating layer covering the plurality of touch/common lines and overlap the plurality of pixel electrodes.

4. The touch sensor integrated type display device of claim 3, wherein each pixel electrode among the plurality of pixel electrodes is connected to the drain electrode of a corresponding thin film transistor exposed through a first contact hole passing through the first insulating layer.

5. The touch sensor integrated type display device of claim 4, wherein the plurality of touch/common electrodes are respectively connected to the plurality of touch/common lines exposed through second contact holes passing through the third insulating layer.

6. The touch sensor integrated type display device of claim 1, wherein the plurality of touch/common lines have the same length in a display area, and
   wherein the plurality of pixel electrodes and the plurality of touch/common electrodes are disposed in the display area.

7. The touch sensor integrated type display device of claim 1, wherein each of the plurality of touch/common lines respectively overlaps a data line among the plurality of data lines.

8. The touch sensor integrated type display device of claim 1, wherein the plurality of touch/common electrodes overlap a same number of touch/common lines among the plurality of touch/common lines.

9. A touch sensor integrated type display device comprising:
   a plurality of gate lines crossing a plurality of data lines;
   a plurality of pixel electrodes disposed at crossings of the plurality of gate lines and the plurality of data lines;
   a plurality of touch/common electrodes overlapping the plurality of pixel electrodes and configured to act as self-capacitive touch sensors for sensing a touch input in a touch sensor driving period and a common electrode for the plurality of pixel electrodes to display an image in a display driving period;
   a first gate line connected to a row of pixels overlapping with a first touch/common electrode among the plurality of touch/common electrodes,
   wherein the first gate line overlaps with a second touch/common electrode among the plurality of touch/common electrodes corresponding to a different row of pixels connected to a second gate line; and
   a gate driver connected to the plurality of gate lines and configured to sequentially supply a first gate signal to the first gate line and a second gate signal to the second gate line,
   wherein the overlapping of the first gate line and the second touch/common electrode offsets a first voltage ripple in the first touch/common electrode due to the first gate signal with a second voltage ripple in the first touch/common electrode due to the second gate signal supplied to second gate line connected to the different row of pixels corresponding to the second touch/common electrode.

10. The touch sensor integrated type display device of claim 9, wherein the first touch/common electrode is vertically adjacent to the second touch/common electrode.

11. The touch sensor integrated type display device of claim 9, wherein the first gate lines is disposed adjacent to a boundary between the first and second touch/common electrodes.

12. The touch sensor integrated type display of claim 9, further comprising:
a plurality of gate electrodes corresponding to thin film transistors for the row of pixels overlapping with the first touch/common electrode,
wherein the plurality of gate electrodes are connected to the first gate line and overlap with the second touch/common electrode corresponding to the different row of pixels.

13. The touch sensor integrated type display of claim 9, further comprising:
a plurality of touch/common lines connected to the plurality of touch/common electrodes, respectively,
wherein each of the plurality of touch/common lines overlaps with one of the plurality of data lines.

14. The touch sensor integrated type display of claim 13, wherein the plurality of touch/common electrodes are made of a transparent conductor and the plurality of touch/common lines are made of an opaque metal with high conductivity.

15. The touch sensor integrated type display device of claim 13, wherein the plurality of pixel electrodes are disposed in a display area, and
wherein the plurality of touch/common lines have the same length in the display area.

16. A touch sensor integrated type display device comprising:
a plurality of touch/common electrodes configured as a common electrode in a display driving mode and individual touch sensors in a touch sensing mode;
a first row of pixels overlapping with a first touch/common electrode among the plurality of touch/common electrodes;
a second row of pixels overlapping with a second touch/common electrode among the plurality of touch/common electrodes,
wherein a first gate line connected to the first row of pixels overlaps with the second touch/common electrode and does not overlap with the first touch/common electrode;
a second gate line connected to the second row of pixels overlapping with the second touch/common electrode; and
a gate driver configured to sequentially supply a first gate signal to the first gate line and a second gate signal to the second gate line,
wherein the overlapping of the first gate line and the second touch/common electrode offsets a first voltage ripple in the first touch/common electrode due to the first gate signal with a second voltage ripple in the first touch/common electrode due to the second gate signal supplied to second gate line connected to the different row of pixels corresponding to the second touch/common electrode.

17. The touch sensor integrated type display of claim 16, wherein the first touch/common electrode is vertically adjacent to the second touch/common electrode, and
wherein the gate line is disposed adjacent to a boundary between the first and second touch/common electrodes.

18. The touch sensor integrated type display of claim 16, further comprising:
a first touch/common line connected to the first touch/common electrode; and
a second touch/common line connected to the second touch/common electrode,
wherein the first and second touch/common lines overlap with first and second data lines, respectively.

* * * * *